Palser & Howland. Sheet 1, 2 Sheets.
Pulp Digester.

No. 2,730. Reissued Aug. 13, 1867.

Inventors;
Joseph B. Palser
Gardner Howland
by their Atty. S. Kennedy

Palser & Howland. Sheet 2, 2 Sheets.

Pulp Digester.

No. 2,730. Reissued Aug. 13, 1867.

Witnesses

Andrew Anderson Jr.

Inventors;

Joseph B. Palzer

Gardner Howland by their att. C. F. Kenrick

UNITED STATES PATENT OFFICE.

JOSEPH B. PALSER AND GARDNER HOWLAND, OF FORT EDWARD, N. Y.

IMPROVEMENT IN APPARATUS FOR THE MANUFACTURE OF PAPER-PULP.

Specification forming part of Letters Patent No. 24,484, dated June 21, 1859; reissue No. 996, dated July 3, 1860; reissue No. 2,730, dated August 13, 1867.

DIVISION 1.

*To all whom it may concern:*

Be it known that we, JOSEPH B. PALSER and GARDNER HOWLAND, of Fort Edward, in the county of Washington, in the State of New York, have invented certain new and useful Improvements in the Manufacture of Paper-Pulp from Straw and other fibrous materials; and we do hereby declare that the following is a full and exact description thereof, reference being had to the accompanying drawings making a part of this specification, in which—

Figure 1:
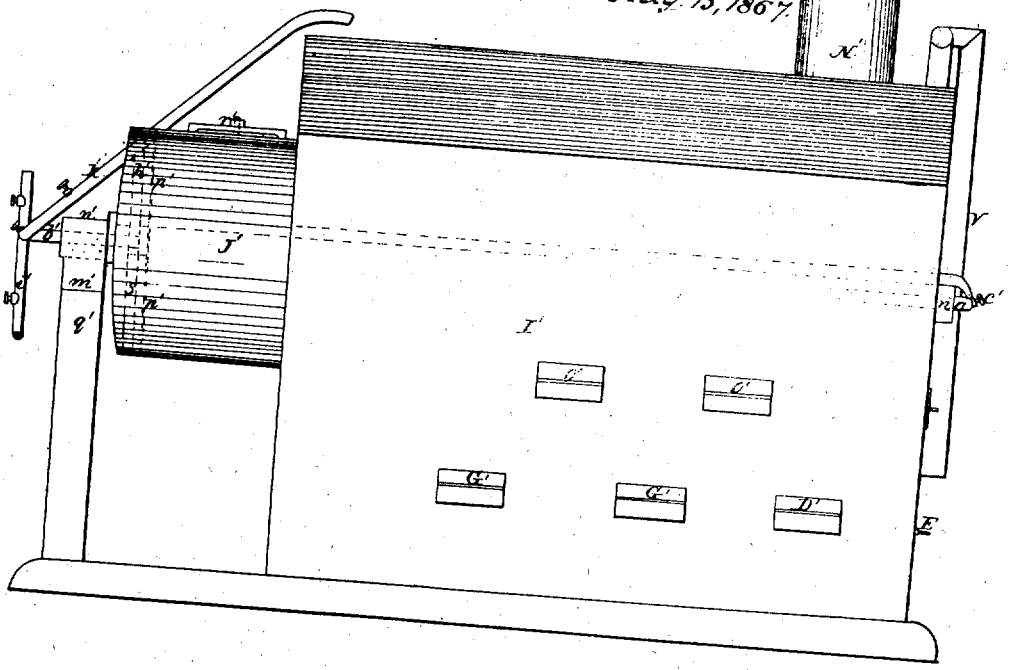
Figure 3:
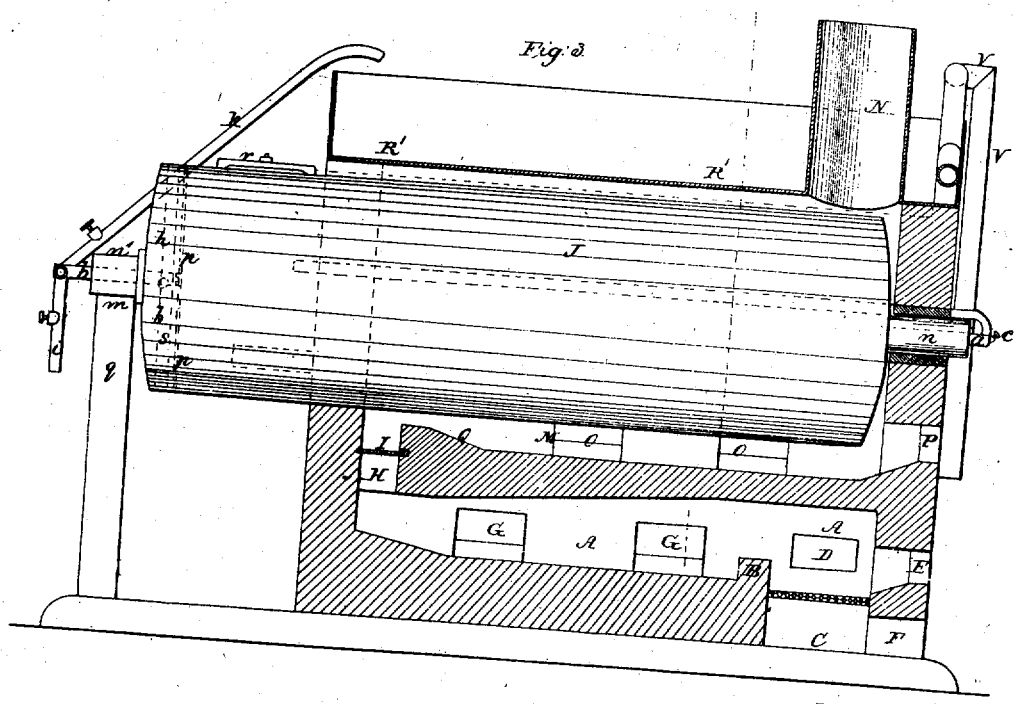
Figure 2:
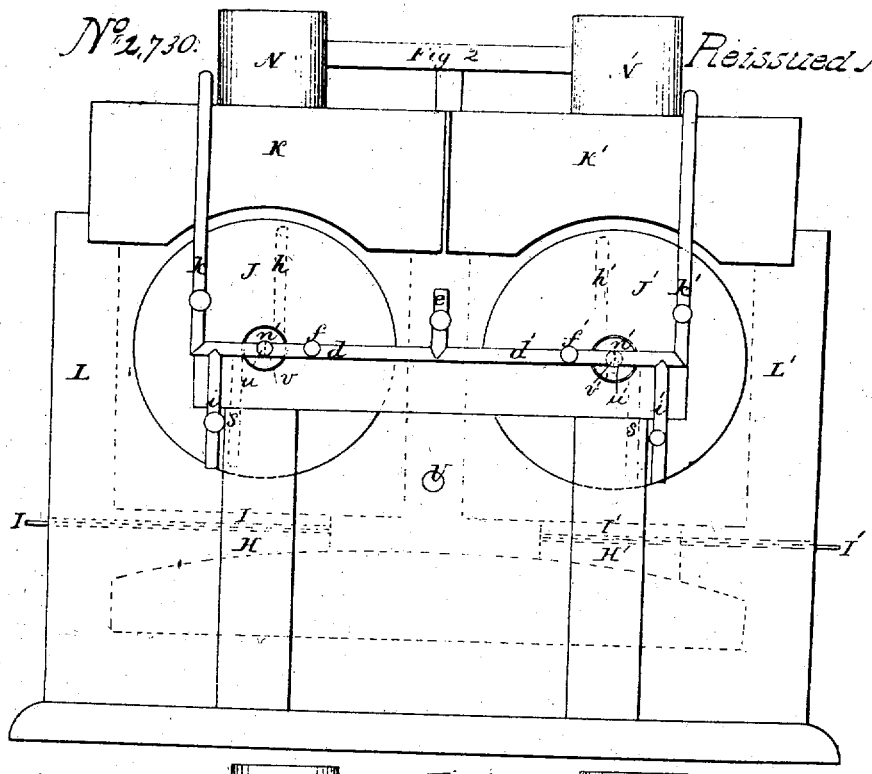
Figure 4:
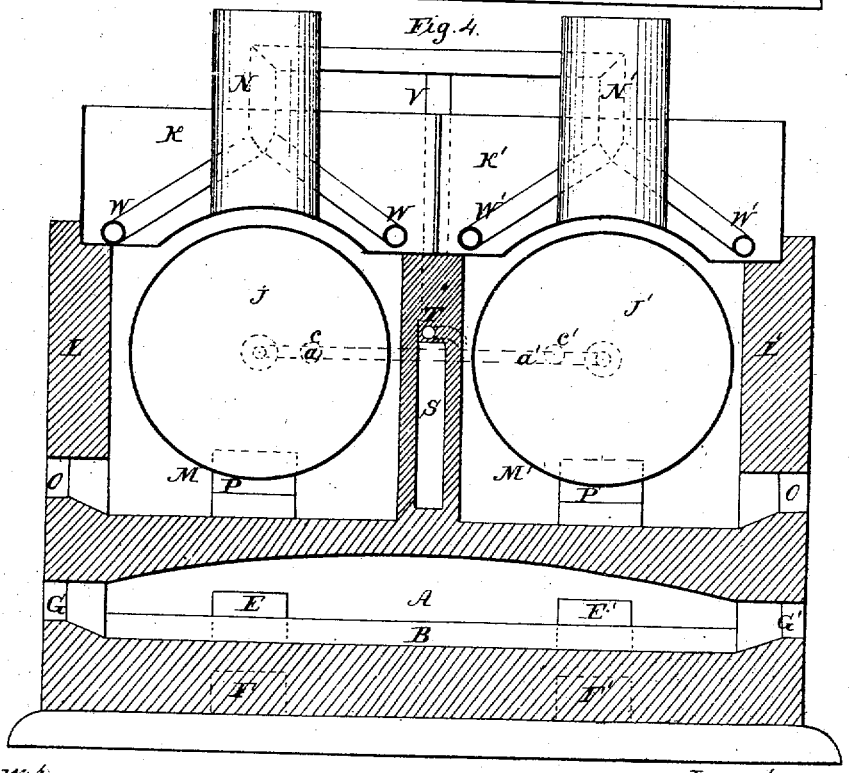

Figure 1 is a side view; Fig. 2, an end view; Fig. 3, a longitudinal section; Fig. 4, a transverse section.

Similar letters of reference indicate corresponding parts in the several figures.

Our apparatus consists of a reverberatory furnace, upon which stands side by side two rotary boilers, each inclosed in a separate envelope, the whole being crowned with two iron vats, one over each boiler.

To enable others skilled in the art to make and use our invention, we will proceed to describe its construction and operation.

In the accompanying drawings, A A is the reverberatory furnace; B, the fire-bridge; C, the fire-place; D D′ and E E′, the fire-doors; F F′, ash or draft openings; G G and G′ G′, doors to the reverberatory furnace; and H′ H′ are two passages, which may be closed by the sliding valves I I′. J J′ are two rotary boilers; K K′, two iron vats above the boilers. L L and L′ L′ are brick, which inclose the boilers and support the vats K K′. M M M′ M′ are spaces between the envelopes and the boilers, forming a flue. N N are chimneys leading from the space M M M′ M′ into the open air through the vats O O P; and O′ O′ P′ are doors giving access to the spaces M M M′ M′. The sills of the doors are a few inches higher than the floor of the spaces M M M′ M′, and these floors are raised at Q Q′, to prevent liquids running into the oven or reverberatory furnace below. The doors G G G′ G′ are higher than the floor of the furnace A A for the same reason. Parts of the bottoms of the vats K K′ are made cylindrical, to encircle the boilers, and form the upper part of the boiler-envelope. R R R′ R′ are holes, closed with plugs, through which the liquid is dropped from the vats over the rotary boilers. Inside the walls which separate the two boilers are a longitudinal passage, S S, and a pipe, T, for warming air and water, respectively. Air is forced by a blowing-engine through pipe U and passage S S. At the other end of this passage the air goes through a pipe, V, and branch pipes W W W′ W′, and escapes through a number of small holes into the liquid contained in the vats, for the purpose of accelerating its evaporation. The pipe T leads from a reservoir of water or other liquid, placed on a higher level than both rotary boilers, and it permits such liquids to be warmed, when needful, in their passage through this pipe. The pipe T T′ is divided into two branch pipes, *a* and *a′*, each of which turns into one of the boilers through stuffing-boxes in the journal, and is provided with a faucet, *c c′*. The pipe T T′ and branches *a a′* are used to fill the boilers with water or other liquids. At the other end of the boilers pipes *b b′* enter therein through journals *n n′*. These pipes are divided lengthwise into two pipes, V V′ and *u u′*, by partitions. (Shown in Fig. 2.) The pipes V V′ are intended for steam, and are united together by a pipe, *d d′*, provided with faucets *f f′*. On the pipe *d d′* is a branch pipe, *e*, on which a safety-valve and a steam-gage may be placed. The pipes *d d′* and *v v′* are united with the upper portions or steam-chambers of the boilers by pipes *h h′*; also, with liquid portions by U and S. The pipes *u u′* are used to empty the boilers from liquids. These pipes extend to the lowest parts of the boilers by pipes *s s′*; and the liquids which are forced out through them may be sent into the vats K K′ through pipes *k k′*, or may be discharged into the gutter through pipes *i i′*. The pipes *h h′* and *s s′* are separated from the "stock" in the boiler by the perforated partitions *p p p′ p′*, and thus they cannot be broken, or even bent, by the pressure of the revolving stock; nor can they be closed by solid matters accidentally forced into them. The partition *p p′* serves also as a strainer, to retain the stock in its own apartment, and yet permit the drawing off of all the liquid matters at any desired time during the operation, hereinafter to be described.

The described arrangement of perforated partitions and pipes may be varied in several ways substantially the same.

The rotary boilers J J′ are supported, as usual, in bearings *m m′* and *n n′*. One end, *m m′*, of each of the rotary boilers and a large portion of their surface are enveloped by the furnace. The other end, *n n′*, projects out sufficiently to leave room for man-holes *r r′*, and, as a consequence, the journals at this end are supported on a frame, *q q′*, separated from the furnace. The other end works in boxes built in the wall of the furnace itself.

The straw is first cut into suitable lengths and subjected to a winnowing process to clean it from dirt, &c., and then crushed between a pair of iron rollers. It is now ready to be acted upon by boiling.

One of the boilers, J, having been emptied of its contents during the time the other, J′, was boiling, (and this boiling under high pressure being just completed,) things are ready for another operation, which is conducted as follows: First, the boiler J is filled with straw or other substance to be boiled, through the man-hole *r*, which is then closed; second, the pipe T is connected with the reservoir of liquid, and by opening the faucet *c* the necessary quantity flows into the boiler J, and the faucet is then closed; third, the valve I′ is closed and valve I is open, and thus fire-heat is transferred from boiler J′ to boiler J; fourth, the faucets *f f′* are opened and steam rushes from boiler J′ to boiler J until the temperature and pressure are equal in both; the faucets are then closed. This operation is very important as the means of raising the temperature in the boiler J in a much shorter time than can be done by fire-heat alone. It also assists in cooling the boiler J′, both of these effects being produced with an economy of time, labor, and fuel. Another important advantage of this discharge of the steam from one boiler into the other is that the steam, by the boiling process, becomes charged more or less with alkaline matter, which is carried over and mixed with the contents of the other boiler. A saving of alkali and of the heating thereof is thereby effected.

In the manufacture of pulp from straw and other fibrous materials we employ sixty gallons of caustic alkali of a strength indicating from $3\frac{1}{2}$° to $3\frac{3}{4}$° Baumé to every one hundred pounds of the cut straw. The alkali mixture and straw having been placed in the steam-boiler, and the man-hole in the latter closed, fire is applied below, and a pressure of one hundred and ten pounds to one hundred and thirty pounds to the square inch is raised. This pressure is maintained for four hours, the boiler being constantly but slowly rotated, and the stock within the boiler being thus kept in gentle agitation.

Having thus described our invention, we claim as new and desire to secure by Letters Patent—

1. The employment of two boilers in the reduction of paper stock, so arranged in respect to each other that the steam-heat remaining in one after the boiling process has been completed may be transferred to the other boiler in which the boiling process is being commenced, in combination with the pipes or other means by which such steam-heat is thus transferred, substantially in the manner and for the purpose above described.

2. The transferring of the steam-heat from a boiler in which paper stock has been boiled, immediately after such boiling has been completed, to another boiler charged with paper stock for the purpose of utilizing the heat remaining in the first boiler after the completion of the boiling process therein, substantially in the manner and for the purpose above described.

3. The arrangement and combination of the boilers, the furnace A, and the doors D D′, E E′, and F F′, so as to apply the furnace-heat to either or both the boilers at pleasure, substantially in the manner and for the purpose above described.

GARDNER HOWLAND.
J. B. PALSER.

In presence of—
JOEL TIFFANY,
EDWARD WADE.